Oct. 19, 1926.

1,603,286

A. LARSON

CONVERTIBLE FORK AND SPOON

Filed Jan. 14, 1926

INVENTOR:
Albert Larson
BY David E. Carlsen
ATTORNEY.

Patented Oct. 19, 1926.

1,603,286

UNITED STATES PATENT OFFICE.

ALBERT LARSON, OF MINNEAPOLIS, MINNESOTA.

CONVERTIBLE FORK AND SPOON.

Application filed January 14, 1926. Serial No. 81,188.

My invention relates to a convertible fork aud spoon, and the object is to further improve the structure covered by my United States Patents, Nos. 1.351,045 and 1,351,046, of August 31st, 1920, as will hereinafter be fully set forth.

Figure 1:
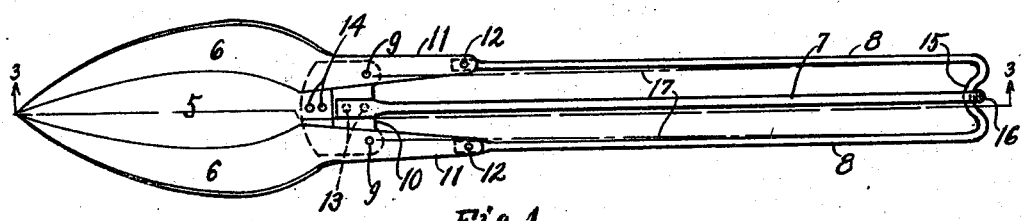
Fig. 1 is a top view of the device with the sections of the bowl held close together to be used as a spoon or dipper.

Referring to the drawing by reference numerals, the bowl of the device is composed of a middle member 5 and two side members 6, and the handle is composed of a rigid middle bar 7 and two side bars 8.

The members 6 are pivoted at 9 to a plate 10 and have rearwardly extending arms 11 pivoted at 12 to the front ends of the rods 8. The rod 7 is firmly secured to the plate 10 by rivets 13 and the central member 5 is likewise secured on said plate 10 by rivets 14. The rivets 13 may preferably be formed or pressed out of the front end portion of bar 7 in the same operation that flattens said end portion.

The rear ends of the bars 8 are connected by a preferably integrally formed and forwardly arched cross-bar 15 the middle of which is firmly held in an eye 16 formed of the rear end portion of the rod 7.

Figure 2:
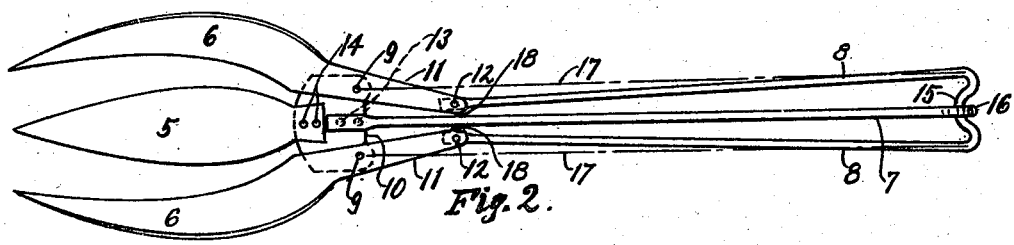
Fig. 2 is also a top view but with the front parts of the device spread to resemble a fork as used either for a fork or as a stirring and beating device for batter used in cooking or baking.
Figure 3:
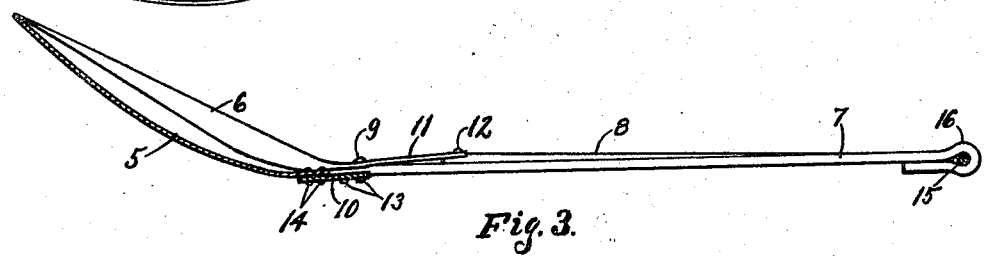
Fig. 3 is a section about as on line 3—3 in Fig. 1.

From this description it will be understood that the cross-bar 15 forms a spring the ends of which constantly press in the direction of the lines 17 toward the front end of the spoon, with the result that whenever the joints 12 are closed inwardly beyond said lines they will be thrown against the bar 7, as at 18 in Fig. 2, and will be held in that position with the members 6 spread, until the operator takes hold of the bars 8 slightly rearward of the joints 12 and spreads the joints outward beyond the lines 17, when the spring 15 will throw the members 6 against the member 5 and hold them in that position as long as desired.

In this way the operator may for instance mix and beat batter with the device spread as in Fig. 2, and then by spreading joints 12 cause the device to close as shown in Fig. 1 and be used for dipping the batter into pans or molds as desired, thus using but one single utensil for two or more operations.

What I claim is:

1. A spoon of the class described having a bowl divided into a rigid middle member and two side members swingable to and from the edges of the middle member, a plate rigidly fixed to the middle member, a central handle bar also rigidly fixed to said plate and extending rearwardly, said side members being pivoted to the plate and having rearwardly projecting arms, a transversely arranged spring bar held by the rear end portion of the central handle bar and having at each end a pushing rod pivotally connected to the arms of the side member in front of it, said spring exerting constant forward pressure on said push rods.

2. The structure specified in claim 1, in which the central handle bar has a loop or eye holding the middle portion of the spring bar.

3. The structure specified in claim 1 in which the spring bar and the push bars are formed of one single piece of wire, and each half of the spring bar is arched rearwardly.

In testimony whereof I affix my signature.

ALBERT LARSON.